United States Patent
Park et al.

(10) Patent No.: US 11,643,079 B2
(45) Date of Patent: May 9, 2023

(54) CRUISE CONTROL METHOD FOR MANUAL TRANSMISSION VEHICLE AND CRUISE CONTROL APPARATUS APPLIED TO THE SAME

(71) Applicants: Hyundai Motor Company, Seoul (KR); Kia Motors Corporation, Seoul (KR)

(72) Inventors: Sun-Young Park, Busan (KR); Oh-Eun Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 296 days.

(21) Appl. No.: 17/029,574

(22) Filed: Sep. 23, 2020

(65) Prior Publication Data
US 2022/0001864 A1 Jan. 6, 2022

(30) Foreign Application Priority Data
Jul. 2, 2020 (KR) .................. 10-2020-0081624

(51) Int. Cl.
*B60W 30/14* (2006.01)
*B60W 50/14* (2020.01)

(52) U.S. Cl.
CPC .......... *B60W 30/143* (2013.01); *B60W 50/14* (2013.01); *B60W 2050/146* (2013.01); *B60W 2510/0208* (2013.01); *B60W 2510/104* (2013.01); *B60W 2710/021* (2013.01); *B60W 2710/1038* (2013.01)

(58) Field of Classification Search
CPC .............. B60W 30/143; B60W 50/14; B60W 2050/146; B60W 2510/0208; B60W 2510/104; B60W 2710/021; B60W 2710/1038
See application file for complete search history.

(56) References Cited

U.S. PATENT DOCUMENTS

| | | | | |
|---|---|---|---|---|
| 5,680,309 A | * | 10/1997 | Rauznitz | B60K 31/00 701/64 |
| 6,202,780 B1 | * | 3/2001 | Tanaka | B60K 31/047 74/3 |

(Continued)

FOREIGN PATENT DOCUMENTS

| | | | | |
|---|---|---|---|---|
| CN | 103429480 A | * | 12/2013 | ............ B60W 50/14 |
| CN | 105074292 A | * | 11/2015 | ........... F16H 37/022 |

(Continued)

*Primary Examiner* — Redhwan K Mawari
(74) *Attorney, Agent, or Firm* — Fox Rothschild LLP

(57) ABSTRACT

In a cruise control method and a cruise control apparatus for a manual transmission vehicle, upon receiving a signal from an input device to start a cruise mode, a cruise control controller calculates an optimal gear stage for satisfying a target cruise traveling speed according to a traveling state of a vehicle, and a display device displays the calculated optimal gear stage to the driver to induce the driver to shift to the optimal gear stage. In addition, whether the gear stage by the driver's operation has matched the optimal gear stage may be determined within a predetermined time to determine whether a cruise control continues according to the determination result, thereby eliminating the driver's inconvenience due to frequent cancellation of the cruise mode.

17 Claims, 4 Drawing Sheets

(56) References Cited

U.S. PATENT DOCUMENTS

| | | | |
|---|---|---|---|
| 10,775,178 B2 * | 9/2020 | Williamson | G01C 21/3602 |
| 2011/0093174 A1 * | 4/2011 | O'Leary | B60W 50/14 |
| | | | 701/64 |
| 2015/0151754 A1 * | 6/2015 | Han | B60W 30/16 |
| | | | 701/96 |
| 2016/0101775 A1 * | 4/2016 | Gibson | B60W 20/20 |
| | | | 903/902 |
| 2016/0288789 A1 * | 10/2016 | Durgin | B60W 20/00 |
| 2019/0322289 A1 * | 10/2019 | Adachi | B60W 10/20 |
| 2019/0344791 A1 * | 11/2019 | Kim | B60W 30/17 |
| 2019/0375394 A1 * | 12/2019 | Maleki | B60W 20/11 |
| 2022/0001864 A1 * | 1/2022 | Park | B60W 30/143 |

FOREIGN PATENT DOCUMENTS

| | | | | |
|---|---|---|---|---|
| DE | 102014009094 A1 * | 6/2015 | | B60W 10/06 |
| ES | 2640949 T3 * | 11/2017 | | F16H 61/2807 |
| KR | 2005-0011495 A | 1/2005 | | |

* cited by examiner

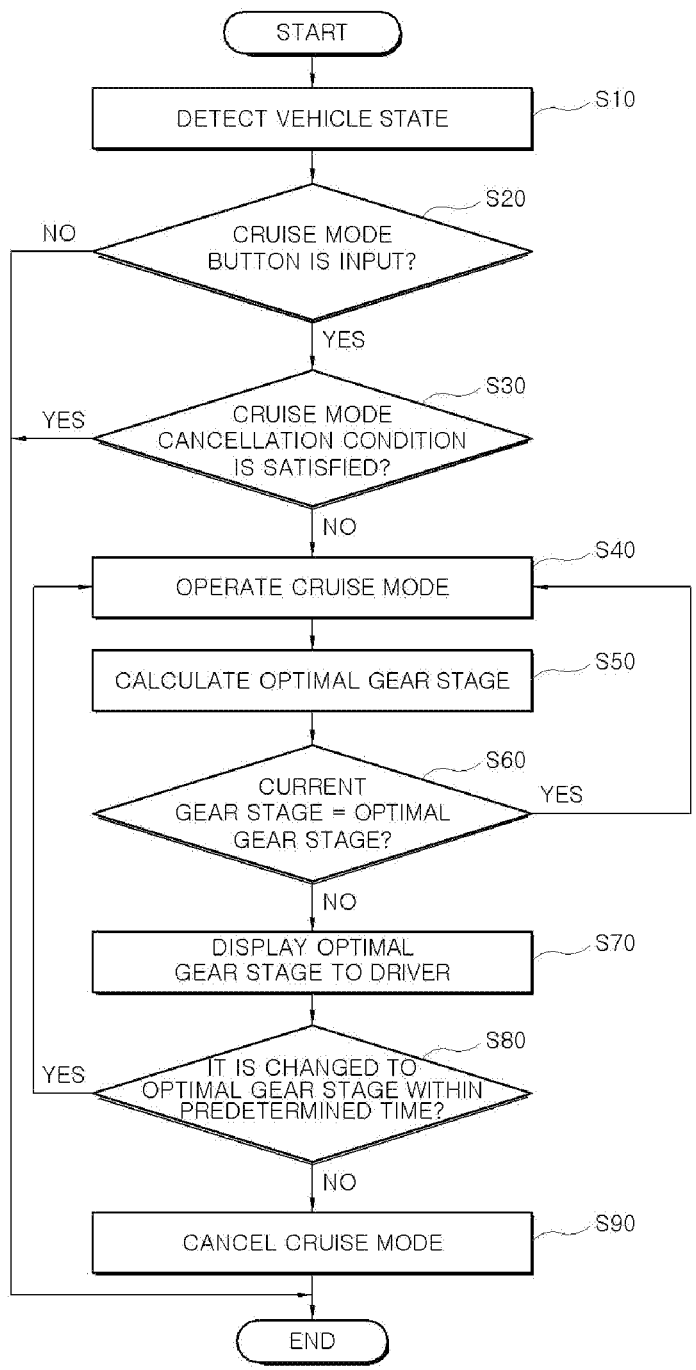

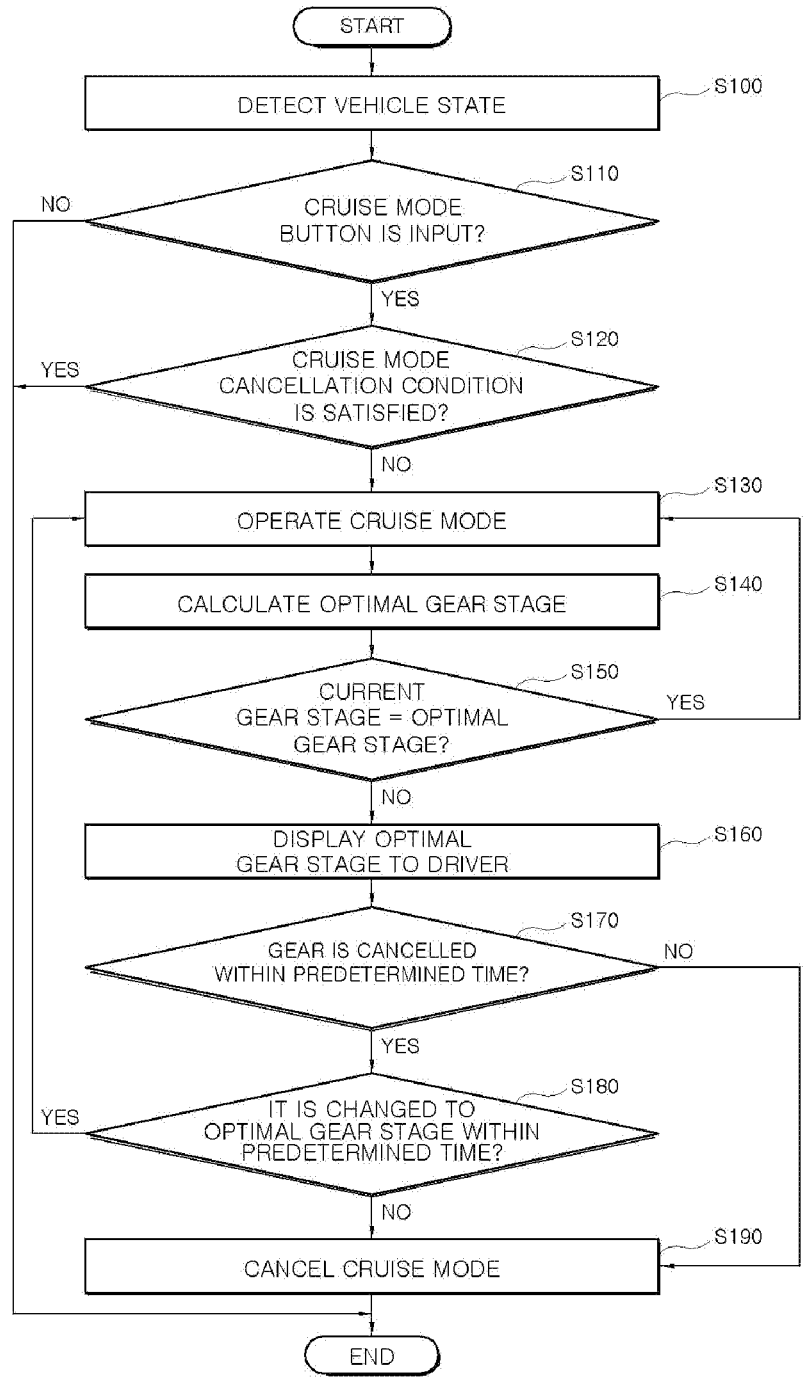

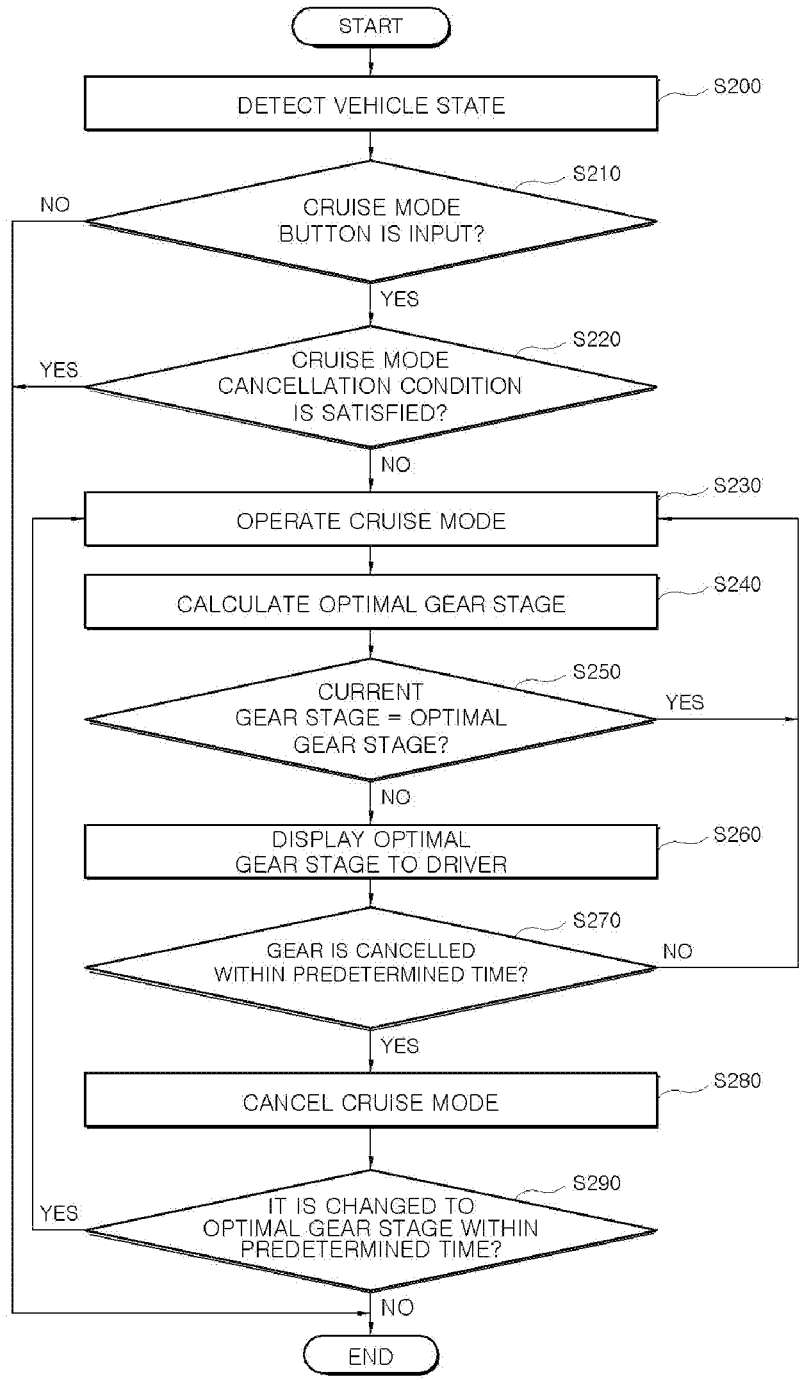

CRUISE CONTROL METHOD FOR MANUAL TRANSMISSION VEHICLE AND CRUISE CONTROL APPARATUS APPLIED TO THE SAME

CROSS-REFERENCE TO RELATED APPLICATION

This application claims under 35 U.S.C. § 119(a) the benefit of Korean Patent Application No. 10-2020-0081624, filed on Jul. 2, 2020, the entire contents of which are incorporated herein by reference.

BACKGROUND

(a) Technical Field

The present disclosure relates to a cruise control method for a manual transmission vehicle and a cruise control apparatus applied to the same, more particularly, to the cruise control method and the cruise control apparatus configured to induce a driver to execute cruise traveling at an optimum gear stage, and suppress frequent changes in a driving mode.

(b) Description of the Related Art

A cruise control apparatus, which is an automatic speed control apparatus for a vehicle, is an apparatus which enables traveling in a state where a vehicle speed is kept substantially constant if an accelerator pedal is not continuously depressed, when the vehicle speed reaches a desired level during traveling. That is, the cruise control apparatus controls opening of a throttle valve only by an operation of a set switch when the vehicle speed is accelerated to a desired vehicle speed during traveling so that the vehicle may be driven at a constant speed.

Meanwhile, as disclosed in Korean Patent Application Laid-Open No. 10-2005-0011495 (Jan. 29, 2005), even in the case of a manual transmission vehicle, a cruise mode which continues to drive the vehicle at a desired speed is applied.

When the cruise mode of the manual transmission vehicle is executed, if the gear stage is not changed in the case where a current gear stage of the vehicle does not match an optimal gear stage for satisfying a target vehicle speed, a throttle is continuously kept in an opened state in order to match the target vehicle speed, so that the RPM of an engine rapidly increases to generate noise, weaken engine durability, and lower fuel efficiency.

However, in the case of a conventional manual transmission vehicle having a manual transmission, when a clutch pedal is depressed for shifting, the cruise mode which is running is cancelled, and there is inconvenience to re-perform a button operation for executing the cruise control by the driver again after shifting.

As described above, conventionally, when the driver changes the gear stage if the current gear stage does not correspond to the optimal gear stage for satisfying the target vehicle speed, the cruise mode is cancelled, so that there is inconvenience in that the driver is required to operate every time in order to restart the cruise mode every time.

The contents described in Description of Related Art are to help the understanding of the background of the present disclosure, and may include what is not previously known to those skilled in the art to which the present disclosure pertains.

SUMMARY

The present disclosure provides a cruise control method for a manual transmission vehicle and a cruise control apparatus thereof, which may induce a driver to execute cruise traveling at an optimal gear stage, and suppress frequent change in a driving mode.

A cruise control method for a manual transmission vehicle according to the present disclosure for achieving the object includes: receiving a signal from an input device to start a cruise mode; calculating, by a cruise control controller, an optimal gear stage for satisfying a target cruise traveling speed according to a traveling stage of a vehicle; displaying, by a display device, the calculated optimal gear stage to a driver; determining, by the cruise control controller, whether a gear stage by the driver's operation has matched the optimal gear stage within a predetermined time; and determining, by the cruise control controller, whether a cruise control continues according to the determination result.

The present disclosure induces the driver to shift to an optimal gear stage by displaying the difference to the driver, if the optimal gear stage satisfying a target vehicle speed in a cruise mode is different from a current gear stage, thereby suppressing the occurrence of a problem such as reduction in fuel efficiency according to an increase of meaningless idling. In addition, by determining whether the cruise mode continues through whether the driver recognizes the displayed contents and has actually performed shifting, it is possible to reduce the driver's inconvenience due to frequent cancellation of the cruise mode.

The method may further include: maintaining a cruise control state for a predetermined time, if the calculated optimal gear stage does not match a current actual gear stage; and cancelling the cruise control if the gear stage is not changed by the driver's operation so as to match the optimal gear stage within the predetermined time.

In this case, if the optimal gear stage does not match the current actual gear stage, by immediately cancelling the cruise mode, and waiting whether the driver shifts to the optimal gear stage within a predetermined time and then determining whether to cancel the cruise mode, it is possible to reduce the driver's inconvenience.

Preferably, the predetermined time may be changed according to the traveling state of the vehicle. Accordingly, if it is necessary to quickly determine whether the cruise mode continues, like uphill traveling, for example, it is possible to shorten a reference time for quick determination.

Preferably, the optimal gear stage may be determined according to a drive mode input by the driver. Accordingly, it is possible to determine whether the driver's intention is fuel-efficient traveling or vehicle power performance-prioritized traveling through the input drive mode, and to determine a gear stage suitable therefor.

Preferably, the optimal gear stage is a gear stage which enables traveling with an engine RPM capable of the minimum fuel consumption upon traveling at the target vehicle speed. Accordingly, it is possible to induce the driver to perform the high fuel efficiency driving.

Preferably, the maintaining of the cruise control state for the predetermined time stops an engine torque control while maintaining the cruise control state. Accordingly, as the result of performing a throttle control so as to maintain the target vehicle speed, it is possible to suppress the occurrence of noise or a reduction in fuel efficiency due to a rapid increase in the engine RPM.

Preferably, the method further includes: determining whether a clutch is operated or a gear stage is switched to a neutral gear by the driver, so that the current gear stage has been cancelled, if the calculated optimal gear stage does not match a current actual gear stage; and maintaining the cruise control for a predetermined time without cancellation, if it is determined that the current gear stage has been cancelled.

Preferably, the method further includes: cancelling a cruise control if the gear stage is not changed by the driver's operation so as to match the optimal gear stage within the predetermined time.

Preferably, the method may further include: determining whether a clutch is operated or the gear stage is switched to a neutral gear by the driver, so that the current gear stage has been cancelled, if the calculated optimal gear stage does not match a current actual gear stage; cancelling the cruise control if it is determined that the current gear stage has been cancelled; and automatically returning to the cruise control if the gear stage is changed by the driver's operation so as to match the optimal gear stage within a predetermined time after the cruise control is cancelled.

The present disclosure may immediately cancel the cruise mode if the optimal gear stage and the current actual gear stage do not match, and the gear is cancelled by the driver, and automatically return to the cruise mode even if the cruise button is not pushed, if the driver shifts to the optimal gear stage within a predetermined time, thereby reducing the driver's inconvenience.

Preferably, the manual transmission may include: an intelligent MT (iMT) performing a clutch control upon shifting by a controller (telematic control unit) of the vehicle.

The cruise control method for the manual transmission vehicle and the cruise control apparatus thereof according to the present disclosure may guide the optimal gear stage to the driver upon traveling in the cruise mode to induce the driver to select the gear stage having the best fuel efficiency in the target vehicle speed.

In addition, the cruise control method for the manual transmission vehicle and the cruise control apparatus thereof according to the present disclosure may induce the driver to operate the gear with the optimal gear stage satisfying the target vehicle speed upon traveling in the cruise mode, thereby suppressing the occurrence of noise and the weakening of engine durability due to the idling at a high speed.

In addition, the cruise control method for the manual transmission vehicle and the cruise control apparatus thereof according to the present disclosure may not cancel the cruise mode, or may automatically return to the cruise mode under a predetermined condition even when the gear stage is changed upon selecting the cruise mode, thereby reducing the driver's inconvenience due to the frequent cancel and reset of the cruise mode.

A cruise control apparatus for a manual transmission vehicle includes: an input device operable to generate a signal to start a cruise mode; a cruise control controller configured to calculate an optimal gear stage for satisfying a target cruise traveling speed according to a traveling stage of a vehicle; and a display device configured to display the calculated optimal gear stage to a driver, wherein the cruise control controller is configured to determine whether a gear stage by the driver's operation has matched the optimal gear stage within a predetermined time, and to determine whether a cruise control continues according to the determination result.

BRIEF DESCRIPTION OF THE DRAWINGS

FIG. 2 is a flowchart illustrating a cruise control method for the manual transmission vehicle according to the present disclosure.

FIG. 3 is a flowchart illustrating another preferred exemplary embodiment of the cruise control method for the manual transmission vehicle according to the present disclosure.

FIG. 4 is a flowchart illustrating still another preferred exemplary embodiment of the cruise control method for the manual transmission vehicle according to the present disclosure.

DESCRIPTION OF SPECIFIC EMBODIMENTS

Figure 1:
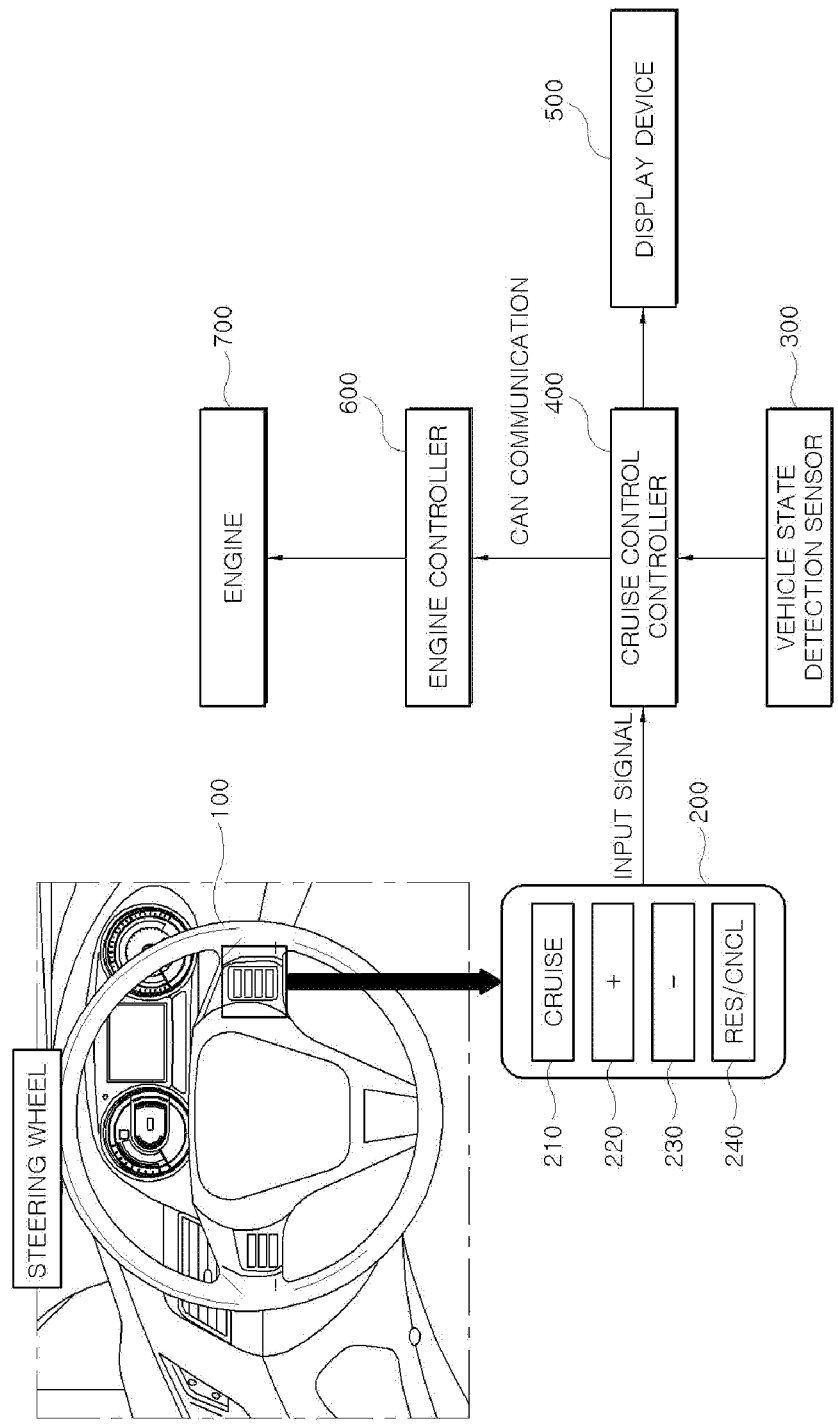
FIG. 1 is a block diagram of a control system for a vehicle including a cruise control apparatus for a manual transmission vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a cruise control method and control device for a manual transmission vehicle according to the present disclosure will be described in detail with reference to the accompanying drawings.

FIG. 1 illustrates a block diagram of a cruise control system for a vehicle including a cruise control apparatus according to the present disclosure.

As illustrated in FIG. 1, a cruise control apparatus for a manual transmission vehicle according to the present disclosure is composed of an input device 200 operated by a driver for a cruise control operation, a vehicle state detection sensor 300 for detecting a vehicle speed, an engine RPM, a current gear stage, and a state of a clutch pedal, and a cruise control controller 400 for receiving an input state of the input device 200 through CAN communication, and transmitting a control signal to an engine controller 600 to travel the vehicle at a predetermined speed according to the input state.

The vehicle state detection sensor 300 is composed of a plurality of sensors for detecting the vehicle speed, the engine RPM, the current gear stage, and the state of the clutch pedal. Preferably, the vehicle state detection sensor 300 includes a vehicle speed sensor composed of a Hall sensor or the like mounted on a drive motor of a transmission to generate a predetermined signal according to the rotating angle of the motor, a gear location sensing sensor sensing a location of a gear shift lever to generate a predetermined signal, a pedal effort sensing sensor for sensing a pedal effort of a clutch pedal or a brake pedal using a load cell or the like to sense an operation of the clutch pedal or the brake pedal, an engine RPM measurement sensor for generating a predetermined signal every time a crankshaft rotates to measure an engine RPM, or the like.

The input device 200 is a device which receives various commands, such as entering and canceling the cruise mode and adjusting a target vehicle speed, by a driver's operation. Preferably, as illustrated in FIG. 1, the input device 200 may be disposed on a steering column of a steering wheel 100 in the form of an input button column 200 composed of a plurality of input buttons 210, 220, 230, 240. However, the location of the input device 200 of the cruise control apparatus according to the preferred exemplary embodiment of the present disclosure is not limited to the location illustrated in FIG. 1 and may also be disposed in an instrument panel or the like of a vehicle.

The input buttons 210, 220, 230, 240 are electrically connected to the cruise control controller 400. Accordingly, the cruise control controller 400 receives input signals from the input buttons 210, 220, 230, 240 when the input buttons 210, 220, 230, 240 are operated by the driver.

Meanwhile, the manual transmission to which the cruise control method according to the present disclosure is applied includes an intelligent manual transmission (iMT) in which a controller such as a telematic control unit (TCU) for the vehicle actively intervenes the clutch control upon shifting, as well as a manual transmission of the traditional method.

The input button column 200 according to the exemplary embodiment illustrated in FIG. 1 includes a cruise button 210 operated by a driver when the cruise traveling is started, an acceleration button 220 increasing a cruise speed upon the cruise traveling, a deceleration button 230 reducing the cruise speed upon the cruise traveling, and a CANCEL/RESUME button 240. Here, the CANCEL/RESUME button 240 is used as a CANCEL button for stopping the cruise traveling during the cruise traveling, and used as a RESUME button for resuming the cruise traveling at a target vehicle speed set upon the immediately-before cruise traveling, during traveling in the state where the cruise function is cancelled. In addition, instead of the CANCEL/RESUME button 240, a CANCEL button for stopping the cruise traveling and a RESUME button for resuming the cruise traveling at the target vehicle speed set upon the immediately-before cruise traveling may also be separately provided.

The cruise control controller 400 receives the input states from the input buttons 210, 220, 230, 240 of the input device 200, and transmits control signals to the engine controller 400 according to the input states of the input buttons 210, 220, 230, 240 to serve to execute or cancel the cruise mode traveling the vehicle at a predetermined speed. In addition, the cruise control controller 400 according to the present disclosure calculates the optimal gear stage which satisfies the target vehicle speed, and causes the display device 500 to output the calculated result. A specific control flow performed by the cruise control controller 400 will be described in detail later with reference to FIG. 2.

The engine controller (ECU) 600 is connected to the cruise control controller 400 through CAN communication. The engine controller (ECU) controls an intake air amount, a fuel injection amount, a brake, and the like of an engine 700 so that the vehicle may constantly travel at the target vehicle speed based on the control signal output from the cruise control controller 400.

Meanwhile, the cruise control controller 400 and the engine controller 600 may also be realized in the form of a computer provided in the vehicle. In that case, they may also be realized by being executed by recording a program for realizing this control function on a computer-readable recording medium, and reading the program recorded on the recording medium in a computer system. In addition, the "computer system" referred to herein is a computer system embedded in a vehicle, and is assumed to include hardware such as an OS and peripheral devices. In addition, the term "computer-readable recording medium" refers to a storage device such as a flexible disk, an optical magnetic disk, a portable medium such as a ROM or a CD-ROM, a hard disk embedded in a computer system, or the like. In addition, the term "computer-readable recording medium" may also include maintaining a program in a short time and dynamically, such as a communication line in the case of transmitting a program through a network such as the Internet or a communication line such as a telephone line, and maintaining a program for a predetermined time, such as a volatile memory inside a computer system which is a server or a client in that case. In addition, the program may also be one for realizing a part of the aforementioned functions, and may also be one capable of realizing the aforementioned function in combination with a program already recorded in the computer system.

The display device 500 is a device for visually displaying the optimum gear stage calculated by the cruise control controller 400 when entering the cruise mode to transfer information about the optimal gear stage to the driver. The display device 500 may be a display device such as a cluster installed on a driver seat or an LCD separately installed on a center fascia. The display device 500 may also display information about not only the optimal gear stage, but also whether to enter or cancel the cruise mode and the target vehicle speed in the cruise mode.

FIG. 2 is a flowchart illustrating a cruise control method performed by the cruise control controller 400 of the cruise control apparatus according to the present disclosure. Hereinafter, a cruise control method of the manual transmission vehicle according to the present disclosure will be described in detail with reference to FIG. 2.

After driving of the vehicle is started by the driver, the cruise control controller 400 detects a vehicle state using the vehicle state detection sensor 300 (S10). Preferably, the vehicle state detection sensor 300 detects a current traveling speed and acceleration of the vehicle, an inter-vehicle distance, operation states of an accelerator and a brake, the number of times of operations, and the like.

Next, the cruise control controller 400 detects whether the cruise button 210 of the input device 200 is operated (S20).

In addition, when the operation of the cruise button 210 is detected, the cruise control controller 400 determines whether the cruise mode cancellation condition is satisfied (S30) before executing the cruise mode. To this end, based on the vehicle state previously received through the vehicle state detection sensor 300 in the S10, the cruise control controller 400 determines whether to execute the cruise mode according to the results of determining whether the current vehicle travels within a speed range in which the cruise traveling is possible, whether a change in the vehicle speed is within a predetermined range, whether the inter-vehicle distance is within a predetermined range, whether the accelerator or the brake is operated, and the like. For example, the cruise control controller 400 does not start the cruise mode if the vehicle speed is too high or low to enter the cruise mode, if the inter-vehicle distance is too short, or if it is determined that the driver intends to accelerate or decelerate the vehicle because he/she depresses the acceleration pedal or the brake pedal.

Meanwhile, when it is determined that the current vehicle state detected by the vehicle state detection sensor 300 does not correspond to a predetermined cruise mode cancellation condition, the cruise control controller 400 operates the cruise mode (S40). The cruise mode causes the engine controller 600 to adjust the opening of the throttle valve to adjust an engine torque so that the vehicle may be travelled at the target vehicle speed.

Meanwhile, when the cruise mode is started, the cruise control controller 400 calculates an optimal gear stage for satisfying the target vehicle speed (S50).

The optimal gear stage at this time may be a gear stage which generates an engine RPM which is almost intermediate between the highest allowable engine RPM (REFES) and the peak torque RPM of the engine in the target vehicle speed in the cruise mode. Preferably, the cruise control controller 400 may store a predetermined map having the optimal gear stage as a result value, and the vehicle speed and the engine RPM as input values in a separate storage means, and calculate the optimal gear stage through the map using the input target vehicle speed and an engine torque value predicted by the corresponding target vehicle speed as the input values.

Alternatively, preferably, as the optimal gear stage, may also be selected a gear stage capable of minimizing fuel consumption among gear stages capable of satisfying the target vehicle speed may also be selected. The fuel consumption amount is determined by the engine torque and the engine RPM. However, since the vehicle maintains constant speed driving at the target vehicle speed in the cruise mode, as described above, the range of the engine torque at that time is predictable. Accordingly, after calculating the engine torque capable of minimizing fuel consumption as much as possible in the target vehicle speed using the predetermined map using fuel efficiency and the target vehicle speed as input values, the optimal gear stage may be calculated through the aforementioned map using the calculated engine torque and the input target vehicle speed as input values.

In addition, the optimum gear stage may be preferably selected in consideration of not only the minimum fuel efficiency but also vehicle power performance. In the case of a vehicle in which the driver may select a drive mode through a separate input switch, the optimal gear stage may be differently selected according to the drive mode selected by the driver. For example, if the selected drive mode is a sports mode, the gear stage capable of generating the highest torque rather than the minimum fuel efficiency may be selected as the optimal gear stage, in the target vehicle speed.

When the optimal gear stage is calculated in the S50, the cruise control controller 400 detects the current gear stage using a measured value of the gear location detection sensor among the vehicle state detection sensors 300, and mutually compares the detected current gear stage to the calculated optimal gear stage (S60).

As the comparison result in the S60, if it is determined that the current gear stage and the calculated optimal gear stage are different from each other, the cruise control controller 400 controls the display device 500 to visually display the shift stage according to the driver's operation during the driving of the vehicle and the calculated optimal shift stage so that the driver may know the calculated optimal shift stage and the shift stage according to the driver's operation during the driving of the vehicle (S70).

The driver who has received the aforementioned visual information operates the clutch to change the current gear stage to the gear stage for satisfying the target vehicle speed in the cruise mode. As described above, the conventional cruise control controller immediately cancels the cruise mode when the driver operates the clutch. On the other hand, according to the cruise control method according to the present disclosure, the cruise control controller 400 causes the vehicle to enter a standby mode which maintains the cruise mode for a predetermined time after displaying the optimal gear stage calculated through the display device 500. In this case, the display indicating the cruise mode in the display device 500 is not turned off and displayed as it is. In addition, whether the driver changes the current gear stage to the calculated gear stage within the corresponding time using the measured value of the gear location sensing sensor is detected (S80). In addition, preferably, during the aforementioned time, in order to prevent the occurrence of noise due to the sudden increase in idling, the vehicle is in the standby mode by stopping the throttle control (engine torque control) for maintaining the target vehicle speed in the cruise mode. In addition, when the driver presses the clutch pedal to enter the shifting operation, a throttle closing control for gear shifting is performed.

Meanwhile, the cruise control controller 400 may preferably vary the aforementioned predetermined time based on a predetermined condition. For example, as the detection result by the vehicle state detection sensor 300, if it is determined that the vehicle travels on ramp, it is preferable to shorten the above time compared to when the vehicle travels on a general road. In addition, as the detection result by the state detection sensor 300, even if the difference between the current gear stage and the optimal gear stage is not large, it is preferable to shorten the predetermined time so that the shifting may be performed in a shorter time.

Meanwhile, if it is detected that the driver has changed the current gear stage to the calculated gear stage within a predetermined time, the cruise mode is maintained (S40). In this case, as described above, if the cruise mode is in the standby state, the throttle control for achieving the target vehicle speed is started again.

Meanwhile, if it is detected that the driver has not changed the current gear stage to the calculated gear stage within the predetermined time, it is determined that the driver has no intention to continue the cruise mode to cancel the cruise mode (S90) to cause the vehicle to enter the normal traveling mode according to the accelerator pedal operation of the driver.

In the S80 of the embodiment described above, if it is determined that the current gear stage and the calculated optimal gear stage are different from each other, the cruise mode is maintained as it is for a predetermined time without additional conditions. However, the S80 may include a control of maintaining the cruise mode assuming that there is an operation related to the gear cancellation of the driver so that a control more suitable for the driver's intention may be performed.

In this regard, FIG. 3 illustrates a flowchart illustrating another preferred exemplary embodiment of the cruise control method for the manual transmission vehicle according to the present disclosure. S100 to S160 in the exemplary embodiment illustrated in FIG. 3 are substantially the same as the S10 to S70 in the exemplary embodiment illustrated in FIG. 2 described above. Accordingly, overlapping descriptions thereof will be omitted.

In the exemplary embodiment illustrated in FIG. 3, if it is determined in S150 that the current gear stage and the calculated optimal gear stage are different from each other, in S160, the optimum gear stage is displayed to the driver, and then the clutch is operated or the gear stage is switched to a neutral gear by the driver for a predetermined time, so that whether the current gear stage has been cancelled is determined (S170).

As the determination result, if it is determined that the current gear stage is cancelled by the driver, it is detected whether the driver changes the current gear stage to the calculated optimal gear stage within a predetermined time (S180). That is, even if the driver cancels the current gear stage, there is a case where the driver wants to maintain the current cruise traveling state, so that the cruise state is maintained for a predetermined time after the gear is cancelled.

However, if it is detected that the driver has not changed the current gear stage to the calculated gear stage within a predetermined time, it is determined that the driver has no intention to continue the cruise mode, so that the cruise mode is cancelled after the predetermined time has elapsed (S190) to enter the normal traveling mode according to the accelerator pedal operation of the driver.

Meanwhile, as the determination result in the S170, if it is determined that the current gear stage is not cancelled by the driver, the cruise mode is immediately stopped, and the normal traveling mode is returned (S190). In this case, the display indicating the cruise mode in the display device 500 is turned off.

FIG. 4 is a flowchart illustrating still another preferred exemplary embodiment different from that of FIG. 3 in connection with the cruise control method for the manual transmission vehicle according to the present disclosure. S200 to S260 in the exemplary embodiment illustrated in FIG. 4 are substantially the same as the S10 to S70 in the exemplary embodiment illustrated in FIG. 2 described above. Accordingly, overlapping descriptions thereof will be omitted.

In the exemplary embodiment illustrated in FIG. 4, if it is determined in S250 that the current gear stage and the calculated optimal gear stage are different from each other, the optimal gear stage is displayed to the driver in S260, and then as in the exemplary embodiment illustrated in FIG. 3, the clutch is operated or the gear stage is switched to the neutral gear by the driver for a predetermined time, so that whether the current gear stage has been cancelled is determined (S270).

As the determination result, if it is determined that the current gear stage has been cancelled by the driver, it is analyzed that the driver has no intention to continue traveling in the cruise mode to immediately cancel the cruise mode (S280).

In addition, after that, whether the driver changes the current gear stage to the calculated optimal gear stage within a predetermined time is detected (S290).

If it is detected that the driver has changed the current gear stage to the calculated gear stage, within the predetermined time, even if the driver does not operate the cruise button 210 of the input device 200, the cruise control controller 400 controls the vehicle to automatically enter the cruise mode immediately (S230). In addition, the display device 500 turns on the display indicating the cruise mode again.

Meanwhile, if it is detected that the driver has not changed the current gear stage to the calculated gear stage within the predetermined time, it is determined that the driver has no intention to continue the cruise mode, so that the vehicle may continue to travel in the normal traveling mode.

Although the present disclosure has been described above with reference to the preferred exemplary embodiments of the present disclosure, those skilled in the art will understand that the present disclosure may be variously modified and changed without departing from the spirit and scope of the present disclosure set forth in the appended claims.

What is claimed is:

1. A cruise control method for a manual transmission vehicle, the method comprising:
   receiving a signal from an input device to start a cruise mode;
   calculating, by a cruise control controller, an optimal gear stage for satisfying a target cruise traveling speed according to a traveling stage of a vehicle;
   displaying, by a display device, the calculated optimal gear stage to a driver;
   determining, by the cruise control controller, whether a gear stage by the driver's operation has matched the optimal gear stage within a first predetermined time; and
   determining, by the cruise control controller, whether the gear stage is changed by the driver's operation to match the optimal gear stage;
   maintaining a cruise control state for a second predetermined time, if the calculated optimal gear stage does not match a current actual gear stage;
   cancelling the cruise control if the gear stage is not changed by the driver's operation so as to match the optimal gear stage within the first predetermined time,
   wherein the cruise control controller causes the vehicle to enter a standby mode which maintains the cruise control state for the second predetermined time after displaying the optimal gear stage and to stop an engine torque control for maintaining a target speed in the cruise control state.

2. The method of claim 1,
   wherein the predetermined time is changed according to the traveling state of the vehicle.

3. The method of claim 1,
   wherein the optimal gear stage is determined according to a drive mode input by the driver.

4. The method of claim 1,
wherein the optimal gear stage is a gear stage which enables traveling with an engine RPM capable of a minimum fuel consumption upon traveling at the target vehicle speed.

5. A cruise control method for a manual transmission vehicle, the method comprising:
receiving a signal from an input device to start a cruise mode;
calculating, by a cruise control controller, an optimal gear stage for satisfying a target cruise traveling speed according to a traveling stage of a vehicle;
displaying, by a display device, the calculated optimal gear stage to a driver;
determining, by the cruise control controller, whether a gear stage by the driver's operation has matched the optimal gear stage within a first predetermined time;
determining, by the cruise control controller, whether the gear stage is changed by the driver's operation to match the optimal gear stage,
maintaining a cruise control state for a second predetermined time, if the calculated optimal gear stage does not match a current actual gear stage;
cancelling the cruise control if the gear stage is not changed by the driver's operation so as to match the optimal gear stage within the first predetermined time,
determining whether the current gear stage has been cancelled by a clutch is operated, or a gear stage is switched to a neutral gear by the driver, if the calculated optimal gear stage does not match a current actual gear stage; and
maintaining the cruise control for the second predetermined time, even if the current gear stage has been cancelled,
wherein the cruise control controller causes the vehicle to enter a standby mode which maintains the cruise control state for the second predetermined time after displaying the optimal gear stage and to stop an engine torque control for maintaining a target speed in the cruise control state.

6. The method of claim 5, further comprising:
cancelling a cruise control if the gear stage is not changed by the driver's operation so as to match the optimal gear stage within the first predetermined time.

7. The method of claim 5, comprising:
determining whether the clutch is operated or the gear stage is switched to a neutral gear by the driver, so that the current gear stage has been cancelled, if the calculated optimal gear stage does not match a current actual gear stage;
cancelling the cruise control if it is determined that the current gear stage has been cancelled; and
automatically returning to the cruise control if the gear stage is changed by the driver's operation so as to match the optimal gear stage within a third predetermined time after the cruise control is cancelled.

8. The method of claim 1,
wherein the manual transmission comprises: an intelligent MT (iMT) performing a clutch control upon shifting by a telematic control unit the vehicle.

9. The method of claim 5, wherein the predetermined first and the second predetermined time is changed according to the traveling state of the vehicle.

10. The method of claim 5, wherein the optimal gear stage is determined according to a drive mode input by the driver.

11. The method of claim 5, wherein the optimal gear stage is a gear stage which enables traveling with an engine RPM capable of a minimum fuel consumption upon traveling at the target vehicle speed.

12. The method of claim 5, wherein the manual transmission comprises: an intelligent MT (iMT) performing a clutch control upon shifting by a telematic control unit the vehicle.

13. A cruise control apparatus for a manual transmission vehicle, comprising:
an input device operable to generate a signal to start a cruise mode;
a cruise control controller configured to calculate an optimal gear stage for satisfying a target cruise traveling speed according to a traveling stage of a vehicle; and
a display device configured to display the calculated optimal gear stage to a driver,
wherein the cruise control controller is configured to determine whether a gear stage by the driver's operation has matched the optimal gear stage within a first predetermined time, and to determine whether the gear stage is changed by the driver's operation to match the optimal gear stage,
wherein the cruise control controller is configured to maintain a cruise control state for a second predetermined time, if the calculated optimal gear stage does not match a current actual gear stage and to cancel the cruise control if the gear stage is not changed by the driver's operation so as to match the optimal gear stage within the first predetermined time, and
wherein the cruise control controller causes the vehicle to enter a standby mode which maintains the cruise control state for the second predetermined time after displaying the optimal gear stage and to stop an engine torque control for maintaining a target speed in the cruise control state.

14. The apparatus of claim 13, further comprising:
a vehicle state detection sensor for detecting a vehicle speed, an engine RPM, a current gear stage, and a state of a clutch pedal to generate and transmit a signal to the cruise control controller panel.

15. The apparatus of claim 14, wherein the input device is disposed on a steering column of a steering wheel in the form of an input button column composed of a plurality of input buttons or is disposed in an instrument panel.

16. The apparatus of claim 14, wherein the cruise control controller is connected to an engine controller (ECU) through CAN communication.

17. The apparatus of claim 16, wherein the manual transmission comprises: an intelligent MT (iMT) performing a clutch control upon shifting by a telematic control unit the vehicle.

* * * * *